United States Patent Office 2,847,034
Patented Aug. 12, 1958

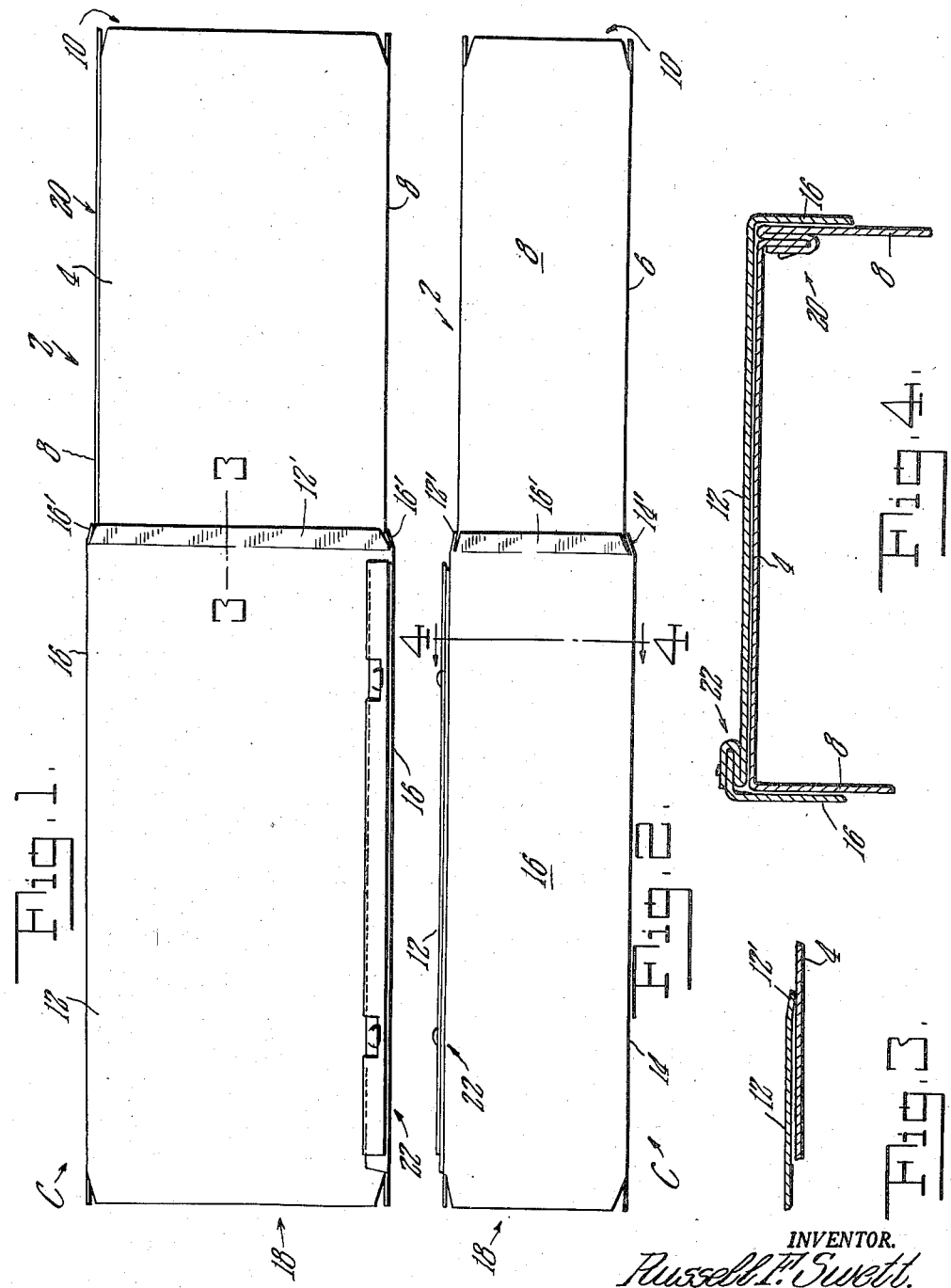

2,847,034

DUCT CONSTRUCTION

Russell F. Swett, Longmeadow, Mass., assignor to Duc-Pac, Inc., East Longmeadow, Mass., a corporation of Massachusetts Application May 18, 1956, Serial No. 585,844

2 Claims. (Cl. 138—25)

This invention relates to new and useful improvements in duct construction.

The principal object of the invention is directed to the provision of improvements in duct construction arranged and adapted to facilitate ease and speed in the installation of ducts.

Ducts of course are used for heating, cooling, ventilating, air-conditioning and other systems and it is an aim of this invention to facilitate the installation of the runs and fitting of the components of a duct system with a minimum of labor so as to reduce costs of installation.

A common form of duct systems may include a main run from which extend one or more branches that are connected to angularly related sections by elbows and the like. Oftentimes, a run of duct must extend over or under a beam or the like or around a projection and, to accomplish this, run sections are connected in offset relation by components such as elbows and various fittings.

Duct sections come in predetermined or standard lengths and adjacent ends of sections are secured together. Where the end of a duct run terminates short of a component to which it is to be connected and there is no available length of duct to make up the gap, it is necessary to prepare a length of duct to suit the gap. This must be done on the job and necessitates cutting off the end of a duct section and forming said end for fitting and connection to the component.

Considerable labor is involved in cutting the end of a duct section and shaping it to the adjacent component. Not only is the connection more than likely to be more or less makeshift and unsightly but the difficulty in making the connection and the delay in installation is costly.

According to one novel feature of this invention, a construction is provided wherein a member which may be called a connector is arranged for sliding on a component for making up a length necessary in order to connect a run section to a component or to connect other duct components.

The invention eliminates the cutting off of the end of a duct component and shaping it for securement to an adjacent component thereby insuring an efficient jointure, a saving of time, and a reduction in the cost of installation.

According to another novel feature of the invention, the connector which is slidable on the inner member is exteriorly seamed and said inner member is internally seamed so as to provide close relation of the components while permitting relative sliding of the components.

Various changes and modifications may be made in duct components without departing from the spirit and scope of the invention to be hereinafter disclosed in the form at present preferred in connection with the accompanying drawings wherein:

Figs. 1 and 2 are plan and side elevational views respectively of duct construction embodying the novel features of the invention;

Fig. 3 is a sectional view on the line 3—3 of Fig. 1 through upper portions of the components thereof; and Fig. 4 is a sectional view on the line 4—4 of Fig. 2, through upper portions of the components thereof.

Referring now to the drawings more in detail, the novel features of the invention will be described.

A duct component of sheet metal is represented by 2 which has upper, lower and opposite side walls 4, 6 and 8 respectively. The end of the member 2 at 10 is prepared for connection to components of various forms.

An outer component C of sheet metal which may be called a connector is formed by upper, lower and opposite side walls 12, 14 and 16 respectively and its end 18 is prepared for connection to various duct components.

The connector C is formed with a snug sliding fit on the component 2 to obviate leakage therebetween.

To provide the desired close but sliding fit between the components, the inner component 2 is internally seamed along one edge, as at 20, and the connector is externally seamed along an edge, as at 22. The seaming portions of the components in this way do not lie between the components 2 and C so that the close sliding fit between the components is obtained.

Seaming may be accomplished in various ways. The form of seaming shown in Fig. 4 however is adequate for the purposes of the invention and forms no part thereof. Suffice to say that the inner and outer components are seamed internally and externally respectively and this may be accomplished in various ways.

The inner ends of the walls of the connector component C are provided with lips 12', 14' and 16' which decline onto the walls of the inner component, or extend inwardly onto said walls.

The walls of the connector C are of sheet metal of the type usually employed for ducts so that the lips are springlike and frictionally engage the walls of the inner component.

Said lips function to seal the walls of the connector to the inner component and at the same time permit longitudinal sliding thereof.

From the foregoing, it will be observed that it is possible to connect relatively spaced adjacent ends of duct components easily and quickly by adjusting the connector, thereby to obviate the cutting and shaping of a duct section end which must be done on the job and is not only time consuming and costly but the results are not in all cases likely to be entirely satisfactory.

Having disclosed the invention in the form at present preferred it is desired to secure and claim the following by Letters Patent of the United States:

1. Duct construction comprising an elongated unitary inner duct component and an elongated unitary outer connector each formed from sheet metal and being rectangular in cross section to have opposite and adjacent walls, said inner duct component having adjacent longitudinal edges of adjacent walls joined as a seam interiorly and extending longitudinally thereof, said outer connector having adjacent longitudinal edges of adjacent walls joined as a seam exteriorly and extending longitudinally thereof, the walls of said connector arranged for a snug sliding fit of said connector on said inner component, each side wall of said connector at corresponding ends thereof being provided with a lip, opposite ends of the lips being free of adjacent lips of adjacent walls, and the said lips extending outwardly of said ends of the walls and relatively converging and being independently yieldable to frictionally engage the side walls of said inner component.

2. Duct construction comprising an elongated unitary inner duct component and an elongated unitary outer connector each formed from sheet metal and being rectangular in cross section to have opposite and adjacent walls, said inner duct component having adjacent longitudinal edges of adjacent walls joined as a seam interiorly and extending longitudinally thereof at the jointure of adjacent walls, said outer connector having adjacent longitudinal edges of adjacent walls joined as a seam exteriorly and extending longitudinally thereof at the jointure of adjacent walls, the walls of said connector arranged for a snug sliding fit of said connector on said inner component, opposite ends each side wall of said connector on opposite ends thereof provided with yieldable lips, opposite ends of said lips being free of adjacent ends of the lips of adjacent walls, and the lips at opposite ends of said connector extending outwardly of said ends of the walls and relatively converging and being independently yieldable to frictionally engage the side walls of said inner duct component.

References Cited in the file of this patent

UNITED STATES PATENTS

| | | |
|---|---|---|
| 718,047 | Campbell | Jan. 6, 1903 |
| 856,839 | Bickel | June 11, 1907 |
| 1,811,277 | Mosley | June 23, 1931 |
| 2,542,967 | Waechter | Feb. 20, 1951 |
| 2,703,110 | Curtis | Mar. 10, 1955 |
| 2,709,454 | Coulters | May 31, 1955 |
| 2,727,536 | Tennison | Dec. 20, 1955 |

FOREIGN PATENTS

| | | |
|---|---|---|
| 67,329 | Sweden | Nov. 12, 1926 |
| 69,088 | Denmark | May 2, 1949 |